United States Patent
Gandar et al.

(10) Patent No.: US 10,618,524 B2
(45) Date of Patent: Apr. 14, 2020

(54) METHOD FOR DETERMINING A REFERENCE DRIVING CLASS

(71) Applicant: COMPAGNIE GENERALE DES ETABLISSEMENTS MICHELIN, Clermont-Ferrand (FR)

(72) Inventors: Benoît Gandar, Clermont-Ferrand (FR); Marc Duvernier, Clermont-Ferrand (FR); Clément Petit, Clermont-Ferrand (FR); Christian Strahm, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/310,040

(22) PCT Filed: Jun. 16, 2017

(86) PCT No.: PCT/FR2017/051567
§ 371 (c)(1),
(2) Date: Dec. 14, 2018

(87) PCT Pub. No.: WO2017/216495
PCT Pub. Date: Dec. 21, 2017

(65) Prior Publication Data
US 2019/0176835 A1  Jun. 13, 2019

(30) Foreign Application Priority Data
Jun. 16, 2016 (FR) ...................................... 16 55598

(51) Int. Cl.
*B60W 40/09* (2012.01)
*B60W 50/14* (2020.01)
*B60W 50/00* (2006.01)

(52) U.S. Cl.
CPC ............ *B60W 40/09* (2013.01); *B60W 50/14* (2013.01); *B60W 2050/0001* (2013.01);
(Continued)

(58) Field of Classification Search
CPC ..... B60W 40/09; B60W 40/105; B60W 50/14
See application file for complete search history.

(56) References Cited

U.S. PATENT DOCUMENTS 9,170,913 B2  10/2015 Hunt et al.
9,280,435 B2   3/2016 Hunt et al.
(Continued)

FOREIGN PATENT DOCUMENTS

DE    198 43 395 A1   3/2000
DE   102014215258 A1  2/2016
(Continued)

OTHER PUBLICATIONS

International Search Report dated Oct. 5, 2017, in corresponding PCT/FR2017/051567 (6 pages).

*Primary Examiner* — Curtis B Odom
(74) *Attorney, Agent, or Firm* — Venable LLP

(57) ABSTRACT

A method for determining a reference driving class of a driver from among a set of predetermined driving classes, each predetermined driving class being characterized by a speed profile, comprises the following steps: The speed of a driver over a given journey is determined, the observed speed is compared with the speed profiles of each of the predetermined driving classes so as to obtain a deviation between the driver and each of the driving classes, a detected driving class is determined as being that which minimizes this deviation, and the reference driving class is determined as a function of this detected driving class.

11 Claims, 1 Drawing Sheet

(52) U.S. Cl.
CPC . *B60W 2050/0019* (2013.01); *B60W 2520/10* (2013.01); *B60W 2520/28* (2013.01); *B60W 2540/04* (2013.01); *B60W 2540/30* (2013.01); *B60W 2550/402* (2013.01); *B60W 2550/406* (2013.01)

(56) References Cited

U.S. PATENT DOCUMENTS

| | | |
|---|---|---|
| 9,384,111 B2 | 7/2016 | Hunt et al. |
| 9,489,280 B2 | 11/2016 | Hunt et al. |
| 9,658,243 B2 | 5/2017 | Shirakata et al. |
| 9,881,498 B2 | 1/2018 | Paromtchik et al. |
| 10,102,096 B2 | 10/2018 | Hunt et al. |
| 2005/0090963 A1 | 4/2005 | Kuhn et al. |
| 2006/0052929 A1* | 3/2006 | Bastian .................. B60K 28/06 701/93 |
| 2013/0164712 A1 | 6/2013 | Hunt et al. |
| 2013/0164713 A1 | 6/2013 | Hunt et al. |
| 2013/0166170 A1 | 6/2013 | Hunt et al. |
| 2013/0184964 A1 | 7/2013 | Hunt et al. |
| 2013/0184965 A1 | 7/2013 | Hunt et al. |
| 2014/0142867 A1 | 5/2014 | Shirakata et al. |
| 2016/0035220 A1 | 2/2016 | Paromtchik et al. |
| 2016/0311441 A1 | 10/2016 | Hunt et al. |
| 2017/0341659 A1 | 11/2017 | Duvernier et al. |
| 2018/0170391 A1 | 6/2018 | Duvernier et al. |
| 2019/0210619 A1 | 7/2019 | Linda et al. |

FOREIGN PATENT DOCUMENTS

| | | |
|---|---|---|
| EP | 2733037 A1 | 5/2014 |
| EP | 2778007 A1 | 9/2014 |
| WO | 03/048613 A1 | 6/2003 |

* cited by examiner

METHOD FOR DETERMINING A REFERENCE DRIVING CLASS

FIELD OF THE INVENTION

The present invention lies in the field of automotive vehicles, and more precisely in the field of systems for assisting the driving of such vehicles.

Today's automotive vehicles are equipped with a great deal of equipment making it possible to improve the safety of the driver and passengers of a vehicle. Thus, braking assistance systems (ABS) making it possible to avoid locking the wheels in case of heavy braking are known. Electronic trajectory correctors (ESP), which make it possible, through trajectory control, to avoid vehicle sideslip, are also known.

The development of these systems has been made possible by the installation of numerous electronic devices in vehicles, and the implementation of ever more powerful electronic computers, making it possible to embed significant computational power on board automotive vehicles without additional bulk.

Numerous driving assistance systems, such as speed limiters, speed regulators, aids to driving on bends, are also appearing. In a step even closer towards autonomous vehicles, systems are also being provided which make it possible to determine recommended running speeds over a complete journey, or a portion of journey. These running speeds can be indicated directly to the driver, or provided to an actuator of the vehicle.

In order to recommend the speeds in the most relevant possible manner, it appears useful to know the vehicle driver's driving category. These speed recommendations can thereafter be transmitted to the vehicle so as to be used by driving aid systems, or displayed in the vehicle, or else be used as reference speed to detect unusual or dangerous behaviours and thus generate alarms making it possible to boost driving safety.

However, though it is known today to choose a recommended speed as a function of a driver preference, no method or system is known which makes it possible to identify the driving class of a driver in real time in the vehicle, and in a manner which is transparent to the driver, that is to say without modifying the running conditions thereof. The present invention is aimed at remedying this lack.

BRIEF DESCRIPTION OF THE INVENTION

Thus, the invention relates to a method for determining a reference driving class of a driver from among a set of predetermined driving classes, each predetermined driving class being characterized by a speed profile, the method comprising the following steps:

The speed of a driver over a given journey is determined,
The observed speed is compared with the speed profiles of each of the predetermined driving classes so as to obtain a deviation between the driver and each of the driving classes,
A detected driving class is determined as being that which minimizes this deviation, and
The reference driving class is determined as a function of this detected driving class.

A method according to the invention is advantageously intended to be implemented in an automotive vehicle.

1—Predetermined Driving Classes

To determine driving categories, the speed and/or the acceleration of a certain number of individuals over a predetermined journey have previously been observed, and a hierarchical classification is performed on all of the available observations. It is specified here that the variables are recorded with a frequency inherent to the recording means. These variables are not statistically considered to be continuous curves, but a set of pointlike observations. Thus, with each individual is associated a set of observations for each of their rides.

The principle of this classification is, by using an appropriate distance notion, to group the users into classes, each class being as homogeneous as possible and the classes being as mutually distinct as possible. In an exemplary embodiment, the classes are such that the intra-class variance is minimized, whilst the intergroup variance is maximized.

In an advantageous manner, to perform the classification, the speed and/or the acceleration of an individual is recorded in the course of several rides over one and the same trip, each ride giving rise to a set of observations. To define the distance between two users, the distance between the reference speeds and/or accelerations of each of these users is computed.

In a hierarchical classification such as this, the number of classes used is chosen a posteriori, and is considered to be appropriate if the interclass variance does not decrease significantly when adding a class. Thus, in an exemplary embodiment of the present invention, the use of six classes has been envisaged, so as to minimize the interclass variance. However, it has been noted that equally relevant results were obtained with four classes. This number of four classes is therefore preferentially chosen, thus making it possible to obtain a good compromise between the parsimony of the computations and a correct representativity of the various driving modes. Indeed, this makes it possible to reduce the computational power and the computation times required without degrading the quality of the results.

Once the classes have been determined, it is possible to determine the mean speed of each class, also called the profile speed. Concretely, with each driving class will be associated a profile comprising to an array of geopositioned points, and a speed associated with each point.

2—Sequence for Identifying a Driving Class

Starting from these predetermined driving classes, a method according to the invention then makes it possible to detect one of them as being the closest to the driving behaviour of the driver at the steering wheel of the vehicle.

For this purpose, in one embodiment, a method according to the invention calls upon an identification sequence, comprising a certain number of steps which will be detailed hereinafter. The identification sequence comprises the following steps:

An initialization step performed just once, on launching the identification sequence.
At each instant, a step of speed observation and of computation of at least one indicator of distance from each of the classes, making it possible to compare the observed speed with each of the driving classes, this computation corresponding to the previously mentioned comparison step, and
A step of terminating the identification.

The identification sequence may be triggered, according to the embodiments of the invention, in one or more of the following cases:

The driver of the vehicle manually triggers an identification sequence,

The identification sequence is launched automatic when starting the vehicle,

The identification sequence is relaunched regularly, during the running phases, to verify that the reference driving class is still the most relevant.

After an initial sequence, the identification process continues in a permanent manner by comparing the observed speed with each of the driving classes over a sliding temporal and/or spatial window.

Thus, the comparison step is performed in tandem with the speed determining, or observing, step. This real-time comparison makes it possible to ensure, even in case of premature interruption of the identification sequence, for example by the driver of the vehicle, the presence of an information item that can be utilized to determine a driving class.

The step of observing, and/or of determining speed implements one or more means from among: the reading of data on the CAN bus of the vehicle, the use of the GPS speed, the use of a device of the counter of wheel revolutions type.

To be able to perform the speed comparison, it is useful to know the positioning of the vehicle. Indeed, the comparison consists in comparing the speed of the vehicle at a geolocated point with the value of the various predetermined speed profiles at the same point.

Thus, in an advantageous embodiment, the vehicle knows the destination and the routes followed, for example because the driver has programmed their journey via a navigator installed in the vehicle.

In the case where the journey is not programmed, a method according to the invention preferentially comprises an initial step consisting in locking the vehicle onto a real route. This step, called "map matching", consists in regularly comparing GPS positions of the vehicle with cartographic data, so as to determine the route followed.

After having crossed a first distance threshold, the termination step, corresponding to the end of the comparison step, consists in verifying whether an end-of-identification criterion is fulfilled, from among the following criteria: the distance traveled is greater than a second predetermined distance threshold, for example 600 metres, the indicator shows a sufficiently sizable deviation between the detected class and the other classes, the journey traveled comprises a significant journey event.

The first distance threshold is aimed at avoiding artefacts due to too short a detection. Indeed, it is noted that over the first few metres of journey, a driver is rarely at their natural speed, and there is therefore a risk of false detection.

The second distance threshold is advantageously chosen in such a way as to guarantee a sufficiently long identification span, while limiting as far as possible the number of data to be processed and the time required to carry out the identification.

Concerning the indicator of distance from the driving class, it is for example determined in the form of a square deviation between the speed of the driver and each of the classes. Thus, when the square deviation between the observed speed and a class is significantly lower than the square deviation from the other classes, for example 100 times smaller, it is possible to stop the identification sequence.

In yet another example, the identification sequence is completed as soon as a significant journey event is encountered, for example a speed variation in order to take a string of curves or motoring through a large bend at steady speed. In yet another example, the identification sequence can be interrupted manually by the driver of the vehicle.

At the end of the identification sequence, or of comparison, it is then possible to identify the driving class for which the deviation between the driver and the driving class is the lowest.

The driving class identified on completion of this sequence is called the "detected driving class" in the present description. In the case of a continuous identification over sliding window, this detected driving class becomes available on completion of the initial sequence, it is thereafter permanently updated. The advantages of being permanently afforded a detected driving class will be seen further on.

In a preferential embodiment, this deviation is computed in the form of a square deviation between the observed speed and the points forming the speed profile. This embodiment will be detailed later.

3—Determination of a Reference Class

On completion of an identification sequence, a driving class is therefore detected, by a method according to the invention, as being the closest to the driver. Starting from this identified class, it is then possible to determine a reference class of the driver.

Thus, in a preferential embodiment, the reference class is determined automatically as being equal to the detected class. In the case of a continuous identification over a sliding window, which can result in a variation of the detected class, it is possible to decide to leave the reference class unchanged, or to modify the reference class only when the detected class is again steady over a sufficient duration.

In another embodiment, the reference class is determined as being equal to the detected class subsequent to validation on the part of the driver. In this case, the method comprises the following steps:

a step of transmitting the detected class to the driver of the vehicle, and a step of receiving a validation information item from the driver.

In another preferential embodiment, a driver of the vehicle can, at any instant, explicitly choose a driving class, for example by way of a graphical interface installed in the vehicle. This choice can be performed prior to the implementation of a method according to the invention, and in this case the class chosen can be used as initial reference class. It can also be performed while running, independently of any identification sequence. In this case, a method according to the invention comprises a step of receiving, from the driver, an information item relating to a chosen class, and of determining the reference class as being equal to this chosen class.

4—Monitoring Method

The invention also relates to a method for monitoring driving, comprising the following steps:

A step of determining reference class, according to a method such as described previously, A step of determining an indicator of distance of the driver from the reference class, and A step of emitting an alert when the indicator fulfils a predetermined alert criterion. The deviation becomes greater than a predetermined threshold.

In a preferential embodiment, where the indicator of distance from the class is expressed in the form of deviation between an instantaneous speed and the reference speed, an alert criterion can be: the distance from the reference class becomes greater than a predetermined threshold, or the instantaneous speed of the vehicle becomes greater than the profile speed of the most dynamic driving class, from among the predetermined driving classes.

In another exemplary embodiment, the alert criterion can be an erratic behaviour of the observed speed with respect to the reference speed.

Indeed, when the behaviour of the driver strays from the profile corresponding to the reference driving class which has been allocated to the driver, this may indicate a drifting of attention, for example sleepiness, or on the contrary dangerous driving. In this case, it is useful to alert the driver, for example by way of a signal included in the group comprising: a sound indicator, a visual indicator such as a light on the dashboard of the vehicle, a vibratory indicator, for example at the level of the seat or of the steering wheel of the vehicle.

In the case where the identification sequence is performed continuously, behaviour of the driver that strays from the profile corresponding to a class will result in a change of detected class and therefore, in the case of automatic validation of the class, a change of reference class. In this case, the determination of a distance from the reference class is no longer a representative element for detecting wayward behaviour of the driver, since the class adapts in real time.

It thus appears useful to provide another device to support an alert device. In this case, the invention relates to a method for monitoring driving comprising the following steps:

A step of determining, continuously, a detected driving class, according to a method in accordance with the invention, A step of recording, in a memory of a computer implementing the invention, the changes of detected classes performed during the identification sequences, and A step of emitting an alert when the number of changes of class over a given period becomes greater than a certain threshold.

DETAILED DESCRIPTION OF THE INVENTION

Figure 1:
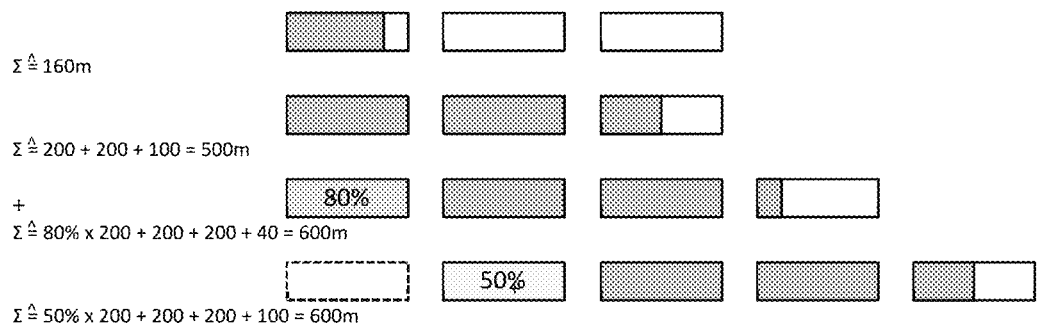
FIG. 1 schematically slices a journey into several segments.

Detailed Embodiment of an Identification Sequence Implemented in a Vehicle Comprising a Graphical Interface In a, nonlimiting, exemplary embodiment, the sequence unfolds as follows:

Initialization phase:
the sums of the square deviations for the n classes are set to zero. The computation of square deviation will be detailed later,
the means of deviation from the n classes are set to zero.
the end-of-identification indicators which so require are initialization (for example for the indicator corresponding to a distance traveled, it is useful to reset the counter to zero at each new sequence e.g. distance traveled=0).
the information item according to which an identification is in progress is transmitted to the driver of the vehicle, via the graphical interface.

Identification Phase:
At each instant, in particular at each cycle of the computer, i.e. every 10 ms:
the non-attainment of the end-of-identification conditions is verified.
the speed of the n class representatives is interpolated as a function of the geopositioning of the vehicle.
the sums of the square deviations for the n classes are updated.
the means of deviation from the n classes are updated.
the end-of-identification indicators are updated.
the driving class is identified, by the smallest deviation sum.
the information item according to which an identification is in progress is transmitted to the driver of the vehicle, via the graphical interface.
the detected class and the mean deviation from the class are transmitted to the driver of the vehicle, via the graphical interface.

Termination phase: at the end of detection
the values are fixed without resetting to zero (stopping of the computations)
the information item according to which an identification is terminated is transmitted to the driver of the vehicle, via the graphical interface.
the detected class and the mean deviation from the class are transmitted to the driver of the vehicle, via the graphical interface.

Determination of the Deviation Between a Driver and a Class: Detailed Embodiment As mentioned previously, a method according to the invention comprises a comparison step, in the course of which a deviation between the speed of the driver and speed profiles associated with various predetermined driving classes is determined. Several statistical indicators can be used to determine this deviation.

In an advantageous embodiment, a square deviation computation will be used. This indicator exhibits the dual advantage of showing a strong divergence, and furthermore of having unsigned behaviour.

For n driving classes, n speed profiles are therefore available, sorted in increasing order of dynamics and geopositioned, in the form of a table: latitude, longitude, $V1, \ldots, Vn$. For each class n, an image of the square deviation is computed:

$$E_n = \sum_{i=1}^{j} (Vvhc_i - Vn_i)^2$$

Vvhc representing the measured speed of the vehicle, and Vn the speed of the profile of class n at the same position.

In a preferential embodiment, an indicator of deviation from the class is also computed, notably in the case of a method of alert such as described previously:

$$\overline{\varepsilon_n} = \frac{1}{j}\sum_{i=1}^{j} (Vvhc_i - Vn_i)$$

This quantity represents the mean deviation with respect to the class profile, over the identification window. This expression for the deviation is not judicious for validly identifying the class. Indeed, summing signed deviations could culminate in a low deviation indicator whilst the driver may be far from the class, alternately positively and negatively. On the other hand, once the class has been determined on the basis of other indicators, the former indicator is very meaningful to the driver since it is expressed directly in km/h.

In one embodiment, to perform these computations, a sample is associated with each timestep. Thus, the sum of the square deviations contains more samples for one and the same distance traveled at low speed than at high speed, this resulting in an overrepresentation of the low speeds, which may falsify the identification.

Consequently, in another embodiment, the computations described previously are triggered not at regular time intervals, but at regular space intervals, for example every 50 cm. This makes it possible to eliminate the overrepresentation of the square deviations for low vehicle speeds in the final sum.

In yet another embodiment, in order to obtain as representative as possible a computation, a different weight can also be allocated to the samples as a function of their representativity. Thus, behaviour in a straight line at stabilized speed is connected more with a legal limitation of the speed with little differentiation between the various driving classes. On the other hand, the difference between classes is more marked in the transient zones where the speed varies and more weight can be given to the samples corresponding to such zones.

Once the computations have been performed, it is then possible to identify a driving class. However, as indicated previously, several embodiments may be envisaged for the frequency of the identification sequences. Indeed, identification may be carried out just once, or on the contrary be repeated continuously to guarantee an updating of the detected driving class if this turns out to be necessary.

A particular embodiment in which continuous identification is performed will therefore be described hereinafter.

Exemplary Embodiment: Continuous Identification Over Sliding Window

By "continuous identification" is meant identification over a temporal and/or spatial sliding window which takes into account only the recent history in view of the chosen end-of-identification criterion. For example, if the end-of-identification criterion is the fact that the distance traveled is greater than 600 metres, the identification of class will be processed only over the sliding window of the last 600 metres.

This exemplary embodiment is illustrated with the aid of FIG. 1, on which a schematic slicing of a journey into several segments is shown.

To be able to carry out a sliding computation, it is chosen to slice the identification distance into n segments, with n small, for example 3 segments of 200 m.

On a first segment, square deviations are computed at each cycle of the computer implementing a method according to the invention, and the sum of the square deviations over this first segment is accumulated. This sum is then added to the square deviations computed the following segment and so on and so forth until the programmed identification distance has been traveled.

In an n+1th sum, the square deviations beyond the programmed distance are added together. The distance traveled "in" this new sum is used to weight the oldest sum.

Thus, in the exemplary embodiment shown in FIG. 1, the identification sequence is considered to have terminated if a distance of 600 metres has been traveled. Each rectangle of this figure corresponds to a segment of 200 metres, this segment having been determined arbitrarily, unconnected with the real journey. The percentages indicated and the infills of the rectangles make it possible to show the weight of each of the segments in the final computation of the square indicator.

The first line corresponds to a distance traveled of 160 metres. In this case, the square deviations are computed over this distance. On completion of these 160 metres, the identification sequence continues. However, if it is interrupted, the accumulation of the square deviations computed over the first few metres makes it possible to provide an information item making it possible to determine a reference class.

On the second line, the distance traveled is 500 metres. In this case, the sum of the square deviations is accumulated over the first segment, corresponding to 200 metres, which is added to the square deviations computed over the second segment, corresponding to a further 200 metres, and this sum is added to the square deviations of the third segment of 100 metres.

The third line illustrates a distance of travel of 640 metres, that is to say a distance greater than the 600-metre criterion used to determine an end of identification. In this case, the first segment is weighted so as to contribute only by 80% by the computation of the square deviation. The second and third segments contribute by 100% and the fourth segment contributes only by 20%, since only 40 metres are traveled.

Lastly, on the fourth line, 900 metres have been traveled. In this case, the first segment is not taken into account in the computation of the square deviation, and the following segments contribute respectively to 50%, 100%, 100% and 50% in the final computation.

It is noted, in such an embodiment, that the total sum of the square deviations varies continuously, and the method actually makes it possible to drop back to zero exactly the weight of the data that have been obsolete for more than a complete segment. Moreover, the method becomes insensitive to the number of samples, and finally, the computations remain few in number and entirely achievable in a very reasonable time.

The use of such slicing into segments has an almost-zero impact on the identification sequence. Indeed, when the end-of-identification criteria are attained, with respect to a unique identification sequence, the computations are simply not fixed. The remainder is strictly identical, in particular, restarting the identification makes it possible at any moment to relaunch the sequence from the beginning, with reinitialization of the data.

Figure 2:
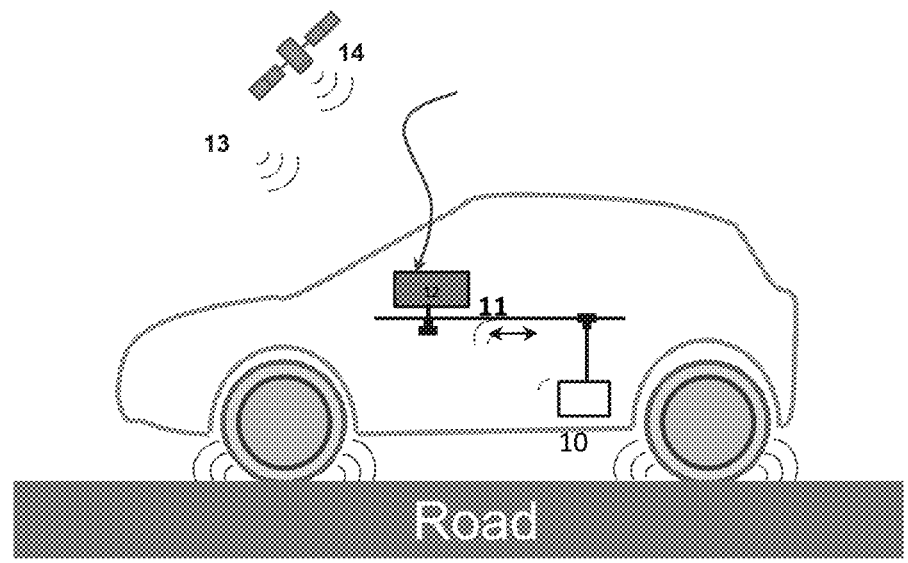
FIG. 2 illustrates a method according to the invention.

Implementation of a Method According to the Invention in a Vehicle:

In an exemplary embodiment, illustrated in FIG. 2, a method according to the invention is implemented concretely in the following manner:

Initially one downloads the speed profiles over a journey programmed in an embedded memory of a computer 10 on a vehicle, A method for determining the reference driving class according to the invention is implemented. Accordingly, the computer 10 determines a speed of the vehicle, either by way of GPS data 14, or by reading data on the CAN bus 11 of the vehicle Optionally, on completion of the implementation of the method, the reference class determined and optionally any alerts triggered while running according to one of the methods of the invention, is or are displayed in the vehicle, for example on a graphical interface of the dashboard.

In another embodiment, the speed profiles are not stored on a memory of the vehicle, but on a remote database. In this case, the vehicle retrieves the information from this database when an individual installs themselves at the steering wheel via telecommunications means installed on the vehicle and receiving GSM data 13. In yet another example, the data relating to the predetermined driving classes are stored in a memory of the vehicle, but they are updated regularly via the GSM link 13.

The invention claimed is:

1. A method for determining a reference driving class of a driver from among a set of predetermined driving classes, each predetermined driving class being characterized by a speed profile, the method comprising the steps of:
    determining a speed of a driver over a given journey;
    comparing the speed with the speed profiles of each of the predetermined driving classes so as to obtain a deviation between the driver and each of the driving classes;
    determining a detected driving class as being that driving class which minimizes the deviation; and
    determining the reference driving class as a function of the detected driving class.

2. The method according to claim 1, wherein the reference driving class is automatically determined to be equal to the detected driving class.

3. The method according to claim 1 further comprising the steps of
    transmitting the detected driving class to the driver of the vehicle; and
    receiving a validation information item from the driver.

4. The method according to claim 1, wherein the comparing step comprises computing a square deviation between the speed and the points forming the speed profile.

5. The method according to claim 1, wherein the comparing step is performed in tandem with the speed determining step.

6. The method according to claim 1, wherein the comparing step is completed when a first distance threshold is crossed and when at least one of the following criteria is fulfilled: the distance traveled is greater than a second predetermined distance threshold, the deviation between the driver and each of the driving classes is less than a predetermined deviation threshold, and the journey traveled comprises a significant journey event.

7. The method according to claim 1, wherein the speed of the driver is determined by one of the following means: reading of data on a CAN bus of the vehicle, use of a GPS speed, and use of a wheel revolution type counter device.

8. The method according to claim 1, further comprising an initial step of choosing an initial driving class.

9. The method according to claim 1, wherein the speed profile is determined by a method comprising the following steps:
    acquiring data representative of a driving speed of a group of drivers on a predefined driving zone, each driver being an individual;
    performing hierarchical classification of the individuals so as to distribute them into a defined number of classes as a function of the data; and
    determining the speed profile for each predetermined driving class.

10. The method according to claim 9, wherein the hierarchical classification is performed using solely a part of the data, the data being chosen from among observations performed on predetermined relevant driving zones.

11. A driving monitoring and alert method for a driver at the steering wheel of a vehicle, the method comprising the steps of:
    identifying a reference driving class using the method according to claim 1;
    determining the speed of the vehicle at a point and the deviation between the speed of the vehicle at the point and the speed profile associated with the reference driving class; and
    if the deviation is greater than a predetermined threshold, emitting an alert for the driver of the vehicle.

* * * * *